(12) United States Patent
Wang et al.

(10) Patent No.: US 8,046,333 B1
(45) Date of Patent: Oct. 25, 2011

(54) INCREMENTAL DUMP WITH A METADATA CONTAINER WALK USING INODE-TO-PARENT MAPPING INFORMATION

(75) Inventors: Fang Wang, San Jose, CA (US); Ling Zheng, Sunnyvale, CA (US); Stephen Manley, Pleasanton, CA (US)

(73) Assignee: NetApp, Inc., Sunnyvale, CA (US)

( * ) Notice: Subject to any disclaimer, the term of this patent is extended or adjusted under 35 U.S.C. 154(b) by 636 days.

(21) Appl. No.: 12/150,936

(22) Filed: Apr. 30, 2008

(51) Int. Cl.
*G06F 7/00* (2006.01)
*G06F 13/00* (2006.01)
*G06F 9/00* (2006.01)

(52) U.S. Cl. .............................. 707/646; 711/162; 713/2
(58) Field of Classification Search ........................ None
See application file for complete search history.

(56) References Cited

U.S. PATENT DOCUMENTS

| | | | |
|---|---|---|---|
| 6,993,539 B2 | 1/2006 | Federwisch et al. | |
| 7,440,965 B1 | 10/2008 | Pruthi et al. | |
| 7,562,077 B2 | 7/2009 | Bisson et al. | |
| 7,624,106 B1 | 11/2009 | Manley et al. | |
| 7,650,341 B1 * | 1/2010 | Oratovsky et al. | 707/999.01 |
| 7,822,758 B1 | 10/2010 | Prakash et al. | |
| 7,873,601 B1 * | 1/2011 | Kushwah | 707/654 |
| 2004/0030668 A1 | 2/2004 | Pawlowski et al. | |
| 2005/0246382 A1 | 11/2005 | Edwards | |
| 2006/0075294 A1 * | 4/2006 | Ma et al. | 714/13 |
| 2006/0248378 A1 | 11/2006 | Grcanac et al. | |
| 2006/0288026 A1 | 12/2006 | Zayas et al. | |
| 2008/0077590 A1 * | 3/2008 | Pandit | 707/8 |

* cited by examiner

*Primary Examiner* — Tarek Chbouki
(74) *Attorney, Agent, or Firm* — Perkins Coie LLP

(57) ABSTRACT

An embodiment of the invention provides a traversal engine that traverses (walks) through metadata containers (e.g., inodes) in a file system and determines the metadata containers that have been modified (added, changed, deleted, or renamed) within a particular time interval. A modified metadata container corresponds to a data container (e.g., file or directory) that has been modified within the particular time interval. The traversal engine records, into a table, information about the modified metadata containers. The traversal engine also records, into the table, parent information corresponding to an immediate parent of a modified data container.

16 Claims, 7 Drawing Sheets

INCREMENTAL DUMP WITH A METADATA CONTAINER WALK USING INODE-TO-PARENT MAPPING INFORMATION

TECHNICAL FIELD

Embodiments of the invention relate generally to an apparatus and method for incremental dump with a metadata container walk using I2P (inode-to-parent) mapping information.

BACKGROUND

In storage technology, a storage appliance is one type of computer that provides services relating to the organization and storage of information or data on storage devices such as, for example, disk drives ("disks"). In other words, a storage appliance is adapted to store and retrieve data on behalf of one or more client processing systems ("clients" or "hosts") in response to external requests received from the hosts. A storage appliance can provide clients with file-level access to data stored in the storage devices. A storage appliance can also provide clients with block-level access to stored data, or with both file-level access and block-level access. For convenience, a storage appliance will be described herein, for the most part, in terms of the former, though the description herein will have application to the latter types of storage appliances as well, as will be apparent to those of ordinary skill in the art in light of the description that follows. Examples of such storage appliances include, but are not limited to, a file server or another type of computing device that provides storage services using a file system to respond to file-oriented data access requests ("filer"), or other types of devices.

A storage appliance includes a storage operating system that implements the file system to logically organize the information as a hierarchical structure of directories and files on the disks. Each file on a disk may be implemented as a set of data structures, e.g., disk blocks, which are configured to store information. A directory may be implemented as a formatted file in which information by other files and directories is stored.

An implemented disk storage for a storage appliance typically has one or more storage "volumes" which are a collection of physical storage disks and which define an overall logical arrangement of storage space. In other words, a storage volume is a logical container that includes a collection of disks. Therefore, the collection of disks is grouped (assimilated) into the storage volume. Each storage volume is generally associated with a file system.

When data in a source storage appliance (or other device) is to be backed up to a destination storage appliance (or other backup device) during "backup", the data in the source storage appliance can, for example, first be copied in a media (e.g., disk, tape, or a solid state device such as, for example, flash memory). The data can then later be copied ("restored") from the media to the destination storage appliance. As a result, the data in the source storage appliance is backed up on the destination storage appliance.

The procedure of copying the data from the source storage appliance to a media is known as a "dump" procedure. When the media is initially empty, the entire data in the source storage appliance is initially copied to the media. This copying of the entire data to the media can then be followed by copying the data from the media to the destination storage appliance. This copying of the entire data from the source storage appliance to the media, and then to the destination storage appliance is known as a "base backup" and "base restore".

When the data in the source storage appliance has been copied to the destination storage appliance, any files or directories that have been subsequently changed in the source storage appliance can then be copied to the media, and then copied from the media to the destination storage appliance. This copying of only changed data from the source storage appliance to the media, and then from the media to the destination storage appliance is known as an "incremental backup procedure". The incremental backup procedure is a less time consuming procedure than the above-mentioned base backup procedure because this procedure involves backing up only the changed files from the source storage appliance.

Each data container (e.g., file or directory) in a file system (in a storage appliance) is typically associated with an inode which is a data structure that stores the metadata of the data container. The actual data associated with an inode are stored in the data blocks. Although the term "inode" is used herein, it is understood that the term "inode" can be any suitable metadata container that contains the metadata for a data container.

To determine the changed data containers (i.e., changed files or changed directories), which have been changed (e.g., modified, added, deleted, or renamed) within a time interval, one current method is to perform a search of the tree structure (e.g., buffer tree) that represents the contents of the file system. A client (e.g., network file system (NFS) client) may be used to examine the tree structure when performing this tree structure search method. In this tree structure search method, each data container (e.g., file or directory) is examined to determine which particular data containers have been changed within the time interval in question. For data containers that have changed within the time interval in question, the contents of the data containers are read from the disks of the source storage system and these contents of changed data containers are then copied to media. These contents can then be copied from the media to a destination storage appliance. As a result, the incremental changes on the source storage appliance are copied from the source storage appliance to the media, and are then copied from the media to the destination storage appliance.

When incremental changes are being copied from the source storage appliance to the media, each data container in the tree structure is first examined in order to determine which of the data containers has changed in the file system in the source storage appliance, within the particular time period in question. The data associated with the changed data container is then copied to the media. However, a second examination of the tree structure is also then required so that, for example, any directory of a changed file is identified. Any additional directories related to the changed file is also identified in this second examination of the tree structure, so that all of the appropriate directories are identified up to the root directory of the persistent point-in-time image (PPTI) (e.g., SNAP-SHOT™) of the file system. SNAPSHOT™ is a trademark of NETAPP, INC. A PPTI is a specified subset of data that is maintained by a storage appliance for a given point-in-time. Typically, this specified subset of data is, for example, a volume of data. This second examination of the tree structure is required to be performed in current methods because in current file system protocols (e.g., the Unix file system protocol), when a changed file is reported to a client, all directories associated with the changed file are also reported to the client. During the above-discussed dump procedure, the data and metadata of directories associated with changed files, as well as the data of changed files, are saved on the media and are then copied from the media to the destination storage appliance when the above-discussed incremental backup procedure is performed. The metadata and data of any directories associated with a change file are used for properly updating the changed file in the tree structure representing the file system contents in the destination storage appliance.

However, the above method of performing the two examinations of the tree structure is a time consuming procedure. Additionally, the current method of reading the metadata of the changed data containers and reading the data contents of the changed data containers (as well as reading the directory content of unchanged directories) can increase the required time to perform the examinations of the tree structure. Therefore, currently used incremental dump procedures suffer from at least the above constraints and deficiencies.

SUMMARY OF EMBODIMENTS OF THE INVENTION

An embodiment of the invention provides a traversal engine that traverses (walks) through metadata containers (e.g., inodes) in a file system and determines the metadata containers that have been modified (added, changed, deleted, or renamed) within a particular time interval. A modified metadata container corresponds to a data container (e.g., file or directory) that has been modified within the particular time interval. The traversal engine records, into a table, information about the modified metadata containers. The traversal engine also records, into the table, parent information corresponding to an immediate parent of a modified data container. The traversal engine also records, into the table, upper parent information corresponding to an upper parent of the immediate parent of the modified data container. The traversal engine can subsequently read the table in order to determine the modified data container and an immediate parent of the modified data container (as well as any upper parent). The traversal engine can then save, into a media, the modified data container corresponding to the modified metadata container and the immediate parent corresponding to the parent information, and any upper parent corresponding to the upper parent information. By traversing the metadata containers in the file system and recording the parent-child relationships (i.e., inode-to-parent mapping information) for each modified metadata container, the traversal engine advantageously reduces the amount of time required in current incremental dump (incremental backup) procedures. The data saved in the media can be subsequently used in an incremental restore procedure for saving data in a backup device.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

An embodiment of the invention provides a traversal engine that traverses (walks) through metadata containers (e.g., inodes) in a file system and determines the metadata containers that have been modified (added, changed, deleted, or renamed) within a particular time interval. A modified metadata container corresponds to a data container (e.g., file or directory) that has been modified within the particular time interval. The traversal engine records, into a table, information about the modified metadata containers. The traversal engine also records, into the table, parent information corresponding to an immediate parent of a modified data container. The traversal engine also records, into the table, upper parent information corresponding to an upper parent of the immediate parent of the modified data container. The traversal engine can subsequently read the table in order to determine the modified data container and an immediate parent of the modified data container (as well as any upper parent). The traversal engine can then save, into a media, the modified data container corresponding to the modified metadata container and the immediate parent corresponding to the parent information, and any upper parent corresponding to the upper parent information. By traversing the metadata containers in the file system and recording the parent-child relationships (i.e., inode-to-parent mapping information) for each modified metadata container, the traversal engine advantageously reduces the amount of time required in current incremental dump procedures. The data saved in the media can be subsequently used in an incremental restore procedure for saving data in a backup device.

Figure 1:
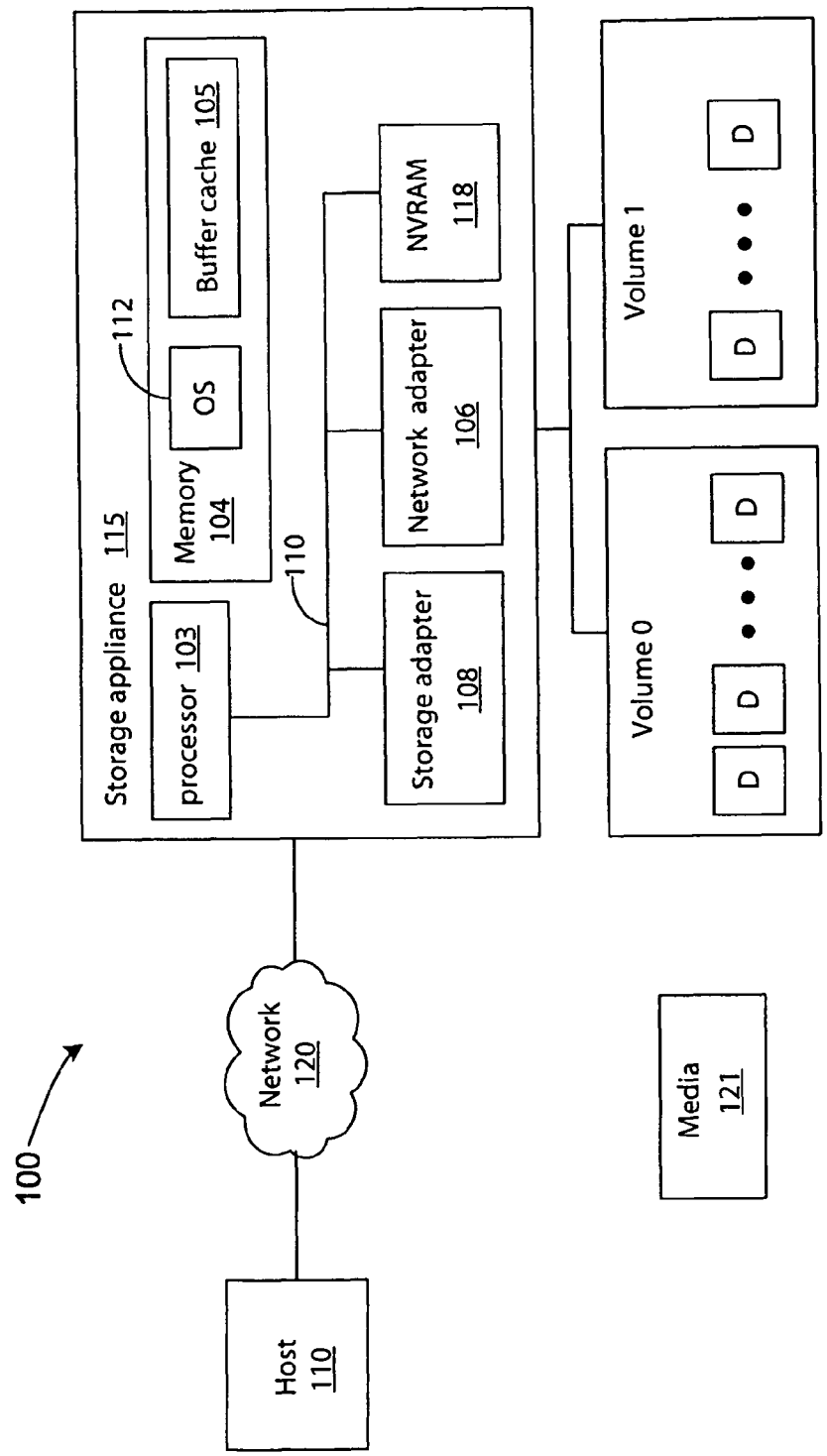
FIG. 1 is a block diagram of a system (apparatus), in accordance with an embodiment of the invention.

FIG. 1 is a block diagram of a system (apparatus) 100, in accordance with an embodiment of the invention. The system 100 includes one or more host devices 110, and one or more storage appliances 115. For purposes of clarity, only one host device 110 and one storage appliance 115 are shown in the example of FIG. 1. The host device 110 and storage appliance 115 can communicate via a network 120 which may be, for example, a local area network (LAN), a wide area network (WAN), virtual private network (VPN), a combination of LAN, WAN and VPM implementations, or another suitable communication network. In another embodiment of the invention, all elements or components that are associated with each of the devices 110 and 115 are implemented in a single device such as, for example, the host device 110. In this alternative implementation, the host device 110 is implemented as a stand-alone computer.

Each of the devices in the system 100 typically includes an appropriate conventional network interface arrangement (not shown) for communicating over the network 102 using a desired communication protocol such as, for example, Transport Control Protocol/Internet Protocol (TCP/IP), User Datagram Protocol (UDP), Hypertext Transfer Protocol (HTTP), Simple Network Management Protocol (SNMP), or other suitable protocols.

A storage appliance is a computer that provides service relating to the organization or storage of information on storage devices, such as, for example, but not limited to, disks. Examples of currently available storage appliance products and associated software components are commercially available from, for example, NETAPP, INC., Sunnyvale, Calif. or other vendors. Additional details of an example storage appliance are also disclosed in, for example, commonly-assigned and commonly-owned U.S. patent application Ser. No. 10/215,917. In addition, it will be understood to those skilled in the art that the embodiments of the invention described herein may also apply to any type of special-purpose computer (e.g., server) or general-purpose computer, including a stand-alone computer, embodied as a storage appliance or file server. Moreover, the teachings of the embodiments of the invention can also be adapted to a variety of file server architectures including, but not limited to, a network-attached storage environment, or a storage area network and disk assembly directly-attached to a client/host computer. The term "storage appliance" or "file server" or "filer" should therefore be taken broadly to include such arrangements.

The storage appliance 115 includes a processor 103, a memory 104, a network adapter 106, and a storage adapter 108 interconnected by a system bus 110. The storage appliance 115 also includes a storage operating system 112 that implements a file system to logically organize the information as a hierarchical structure of directories and files on a storage device (e.g., disk). Additionally, a persistent storage device 118 such as, for example, a non-volatile RAM (NVRAM) 118 is also typically connected to the system bus 110. Although NVRAMs are shown in FIG. 1, any suitable persistent storage device that retains content in the event of a power failure or other system failure can be used in place of the NVRAMs. An example of a suitable persistent storage device is a battery-backed RAM, although other suitable storage devices may also be used.

In an illustrative embodiment, the memory 104 may have storage locations that are addressable by the processor 103 for storing software program code or data structures for use in the functions of the storage appliance 115. The processor 103 and adapters 106 and 108 may, in turn, include processing elements and/or logic circuitry configured to execute the software code and manipulate the data structures.

The storage operating system 112, portions of which are typically resident in memory 104 and executed by the processing elements, functionally organizes a storage appliance by inter-alia invoking storage operations in support of the file services that are implemented by the storage appliance. It will be apparent by those skilled in the art that other processing and memory implementations, including various computer readable media may be used for storing and executing program instructions pertaining to the inventive techniques described herein.

The network adapter 106 includes the mechanical, electrical, and signaling circuitry for connecting the storage appliance 115 to a host 110 over the computer network 120 or connecting the storage appliance 115 to other storage appliance(s). A host 110 can be a general-purpose computer configured to execute applications including file system protocols such as, for example, the Network File System (NFS) or the Common Internet File System (CIFS) protocol or other suitable protocols. Moreover, the host 110 can interact with the storage appliance 115 in accordance with the known client/server model of information delivery.

The storage adapter 108 cooperates with the storage operating system 112 in order to access information requested by the host 110. Each storage volume is constructed from an array of physical storage devices (D) that are typically organized as, for example, RAID groups. The RAID groups include independent physical disks including those storing a striped data and those storing separate parity data. The number of physical storage devices (e.g., disks) in a storage volume and in a RAID group may vary.

The storage adapter 108 includes input/output interface circuitry that couples to the storage devices over an I/O interconnect arrangement such as, for example, a conventional high-speed/high-performance fibre channel serial link topology. The information is retrieved by the storage adapter 108, and may be processed by the processor 103 (or the adapter 108 itself) prior to being forwarded over the system bus 110 to the network adapter 106, where the information is formatted into a packet and returned to the host 110.

To facilitate access to the storage devices D, the storage operating system 112 typically implements a file system that logically organizes the information as a hierarchical structure of directories in files on the storage devices D. Each file on a storage device D may be implemented as a set of data blocks (i.e., disk blocks) configured to store information such as text or other format. The directory may be implemented as a formatted file in which other files and directories are stored. The storage operating system 112 associated with each volume is, for example, the Data ONTAP® storage operating system which is commercially available from NETAPP, INC. Additional details of an example storage operating system 112 are disclosed in, for example, commonly-assigned and commonly-owned U.S. patent application Ser. No. 10/836, 090. The Data ONTAP storage operating system implements a Write Anywhere File Layout (WAFL)® file system. However, it is expressly contemplated that the principles of embodiments of this invention can be implemented using a variety of alternate storage operating system architectures.

Figure 2:
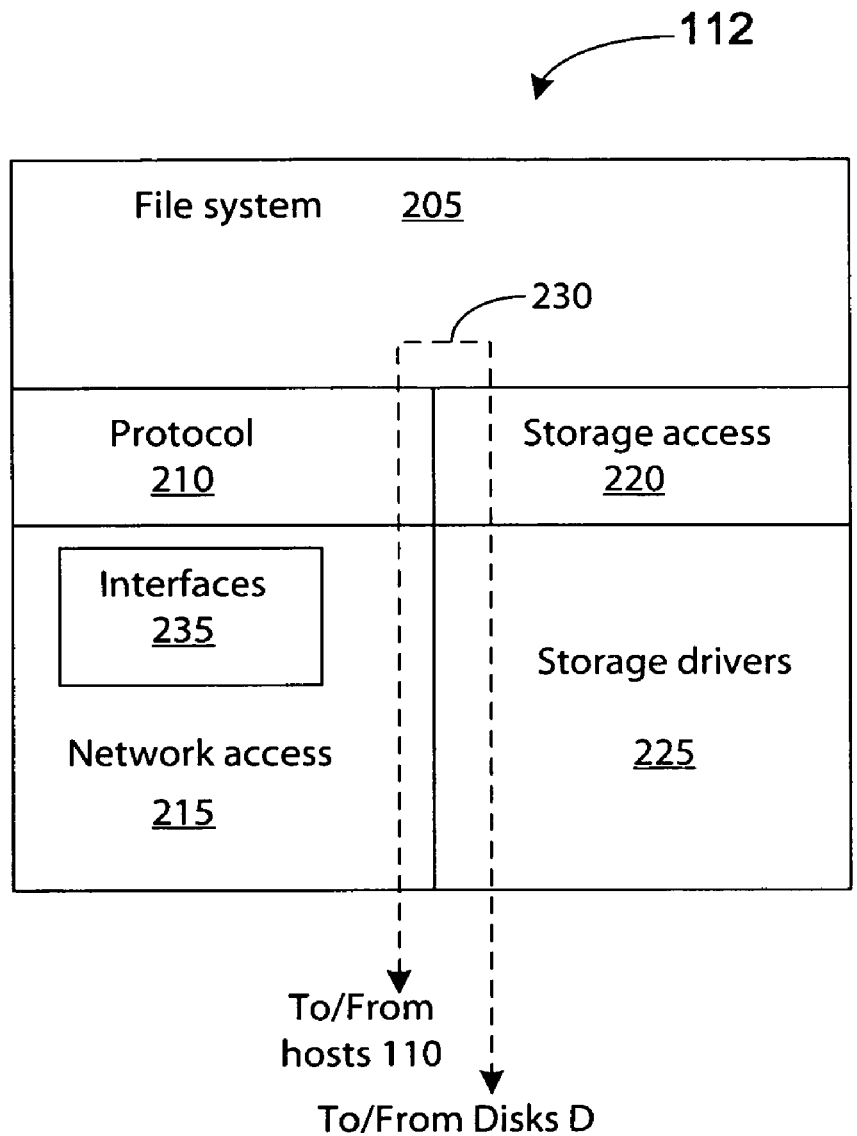
FIG. 2 is a schematic block diagram of an example storage operating system that can be used in an embodiment of the invention.

FIG. 2 is a schematic block diagram of an example storage operating system 112 that may be advantageously used in an embodiment of the invention. As shown, a storage operating system 112 includes several modules, or "layers". These layers include a file system 205. The file system 205 is application-layer software that keeps track of the directory structure (hierarchy) of the data stored in a storage subsystem and manages read/write operations on the data (i.e., executes read/write operations on the storage devices D, e.g., disks, in response to client requests). The operating system 112 also includes a protocol layer 210 and an associated network access layer 215, to allow a storage appliance to communicate to devices in a network, such as the host 110. The protocol 210 layer implements one or more of various higher-level network protocols, such as, for example, Network File System (NFS), Common Internet File System (CIFS), Hypertext Transfer Protocol (HTTP) and/or Transmission Control Protocol/Internet Protocol (TCP/IP), which are network protocols that are known to those skilled in the art. The network access layer 215 includes one or more drivers that implement one or more lower-level protocols to communicate over the network, such as Ethernet. The network access layer 215 may incorporate one or more interfaces 235 that receive input commands from a user.

The storage operating system 112 also includes a storage access layer 220 and an associated storage driver layer 225, to allow a storage appliance to communicate with a storage subsystem. The storage access layer 220 implements a higher-level disk storage protocol, such as RAID, while the storage driver layer 225 implements a lower-level storage device access protocol, such as Fibre Channel Protocol (FCP) or SCSI, which are protocols that are known to those skilled in the art. Also shown in FIG. 2 is path 230 which represents the data flow through the storage operating system 112 associated with a read or write operation. Additional details of an example storage operating system 112 are described in, for example, commonly-assigned and commonly-owned U.S. patent application Ser. No. 10/836,090 and 11/117,852.

As used herein, the term "storage operating system" generally refers to the computer-executable code operable to perform a storage function in a storage appliance, e.g., that manages data access and may, in the case of a file server, implement file system semantics. In this sense, the Data ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., file server, filer or multi-protocol storage appliance) or general-purpose computer, including a standalone computer or portion thereof, embodied as or including a storage appliance 115. An example of a multi-protocol storage appliance that may be advantageously used with the present invention is described in commonly-assigned and commonly-owned U.S. patent application Ser. No. 10/215,917. Moreover, the teachings of this invention can be adapted to a variety of storage appliance architectures or storage system architectures including, but not limited to, a network-attached storage environment, a storage area network and disk assembly directly-attached to a client or host computer. The term "storage appliance" should therefore be taken broadly to include such arrangements in addition to any subsystems configured to perform a storage function and associated with other equipment or systems.

Figure 3A:
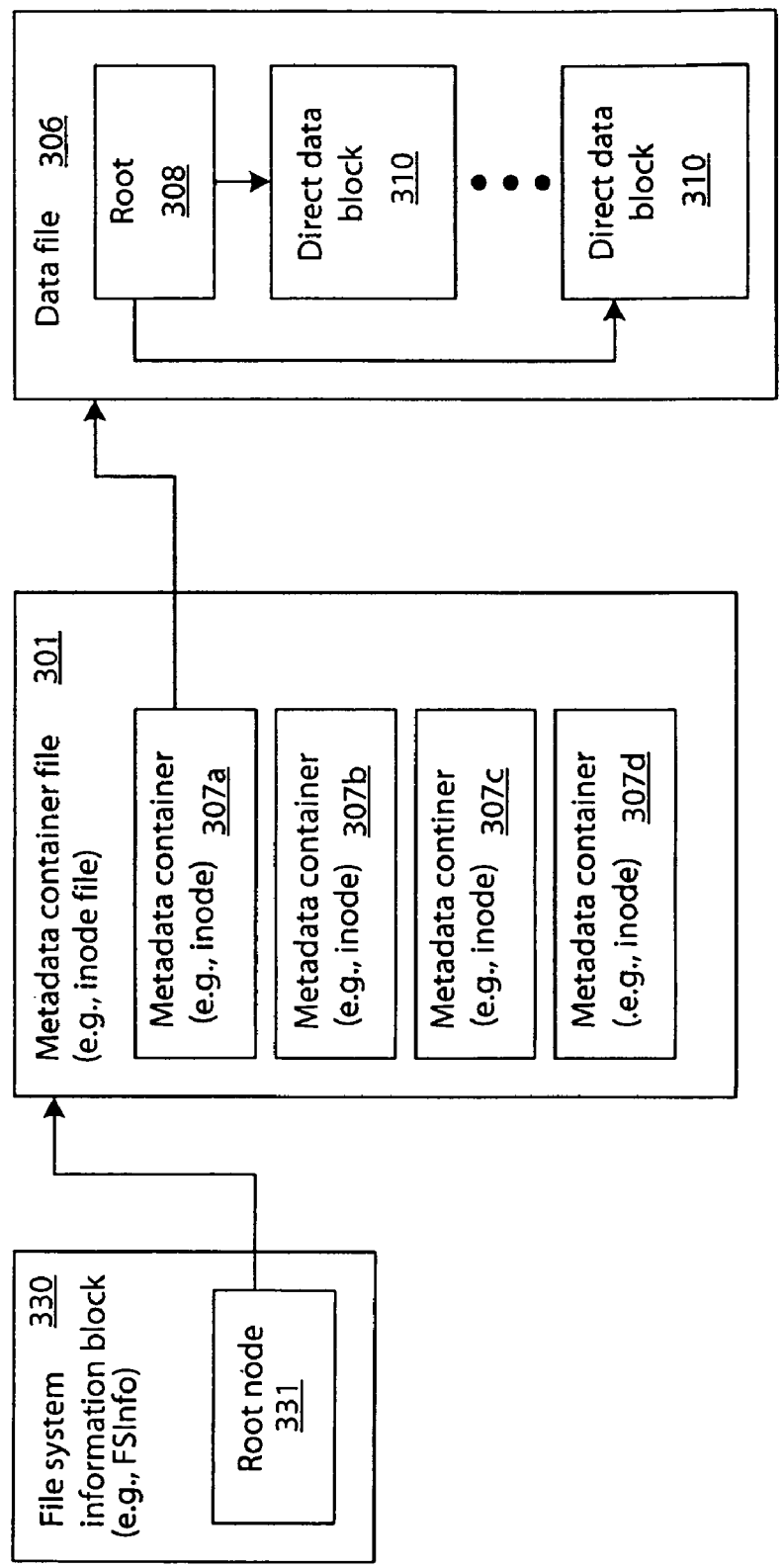
FIG. 3A is a block diagram that illustrates the data structures of a file system that can be used in an embodiment of the invention.

FIG. 3A is a block diagram that illustrates the data structures of a file system that can be used in an embodiment of the invention. An FSinfo structure (file system information structure) 330 can be broadly defined herein as any data structure represents a given persistent-point-in-time image (PPTI) (e.g., a given snapshot) of a file system. Snapshot® is a registered trademark of NETAPP, INC. A PPTI (e.g., snapshot) can be any point-in-time representation of data (e.g., file system) that is stored in a storage device (e.g., one or more disks).

There is one FSinfo structure 331 for every persistent point-in-time image (PPTI) (e.g., snapshot) that is present in a volume in a file system. The structure of a PPTI includes a root node 331 that points to metadata container file 301 which has information about all metadata containers (e.g., modes) for a given volume at a particular time. One example of the metadata container file 301 is an mode file. In FIG. 3A, the metadata container file 301 contains the metadata containers 307a-307d for given volume at a particular time as a simplified example. As an example, the metadata container 307a includes a pointer to a corresponding data file 306 which has the data of a file that corresponds to the metadata container 307a. The metadata container 307a also includes metadata that relates to the data file 306.

The data file 306 also includes a root node 308 that contain pointers to direct data blocks 310. The direct data blocks 310 contain a portion of the actual data of the file that corresponds to the metadata container 307a. As an example, the metadata container 307a is an mode 307a for a file that has the data blocks 310.

Figure 3B:
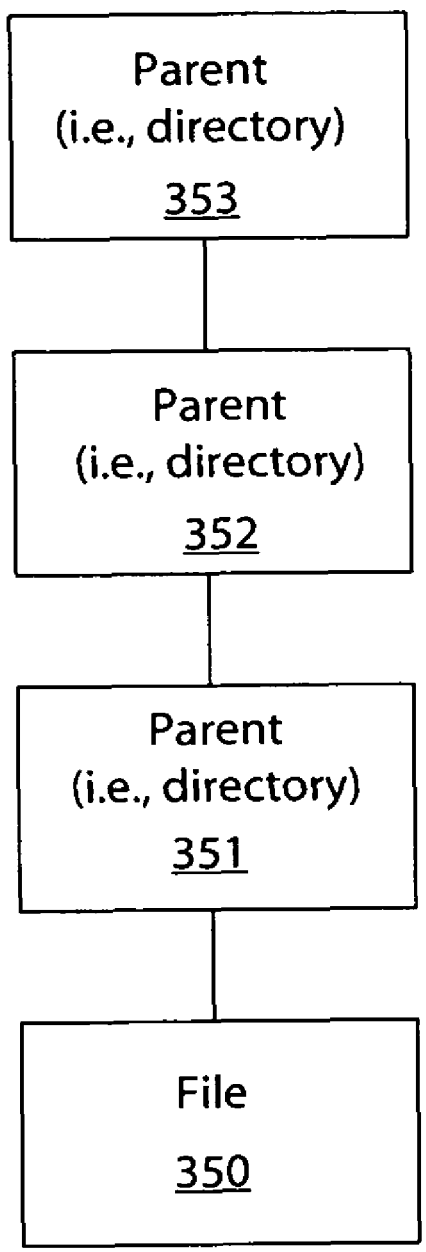
FIG. 3B is a block diagram that illustrates an example file associated with one or more directories that can be used in an embodiment of the invention.

In an example as shown in FIG. 3B, assume that the file 350 is a file that has been changed (e.g., modified, added, or deleted) in a given time interval. Assume also that the file 350 has an immediate parent 351 (i.e., file 350 is in a directory 351). In the example of FIG. 3B, the immediate parent 351 also has an upper parent 352 (i.e. directory 352), and the parent 352 also has an upper parent 353 (i.e., directory 353). Note that the parent-child relationships between the data containers (i.e., file 350 and directories 351-353) in FIG. 3B may vary (e.g., there could be a lesser number of data containers such as directories, in other examples).

In this example, the metadata container (e.g., inode) 307a (FIG. 3A) is associated with the file 350. The metadata containers 351-353 are associated with, for example, directories 351-353, respectively.

Figure 4:
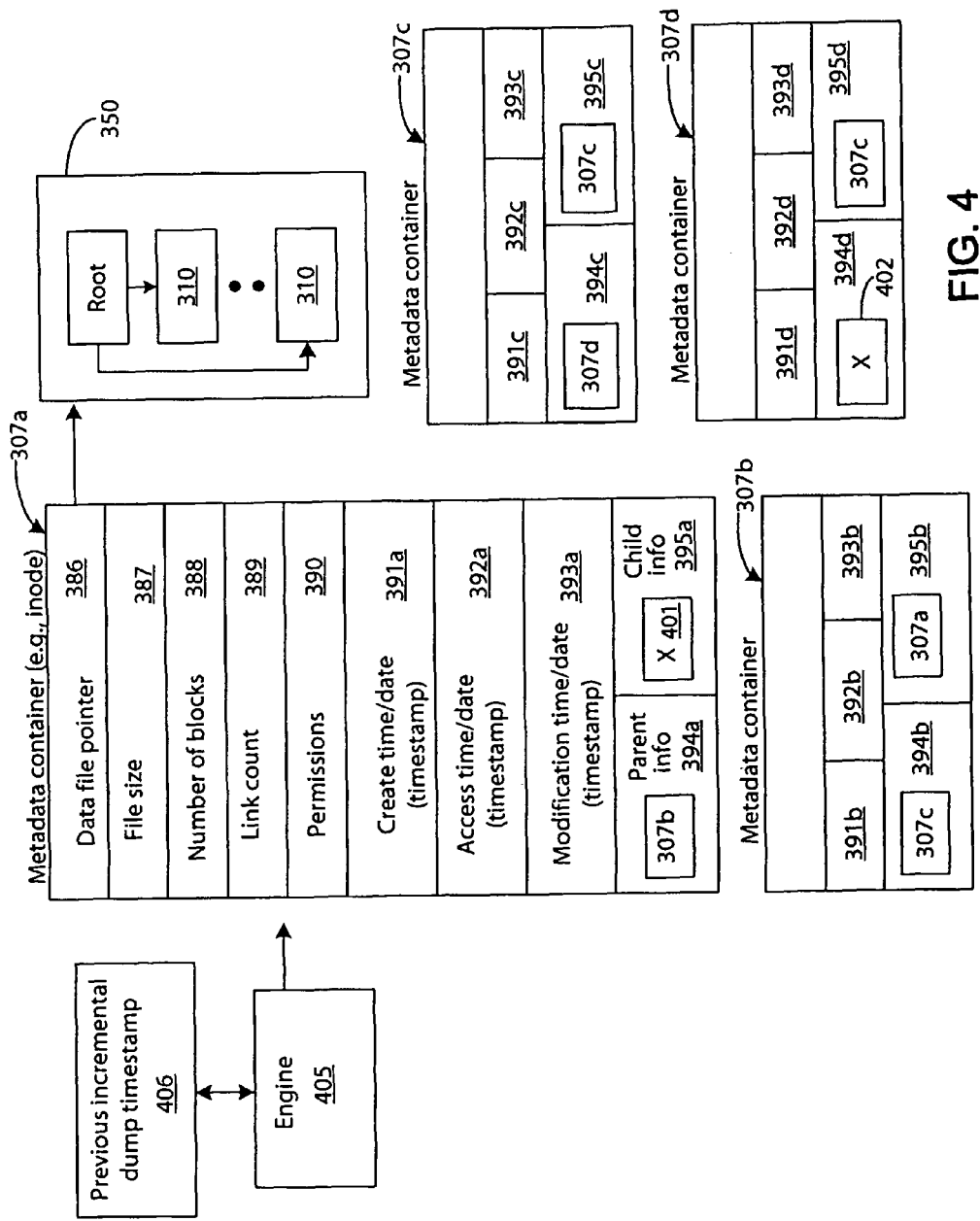
FIG. 4 illustrates additional details of the metadata containers that can be used in an embodiment of the invention.
Figure 5:
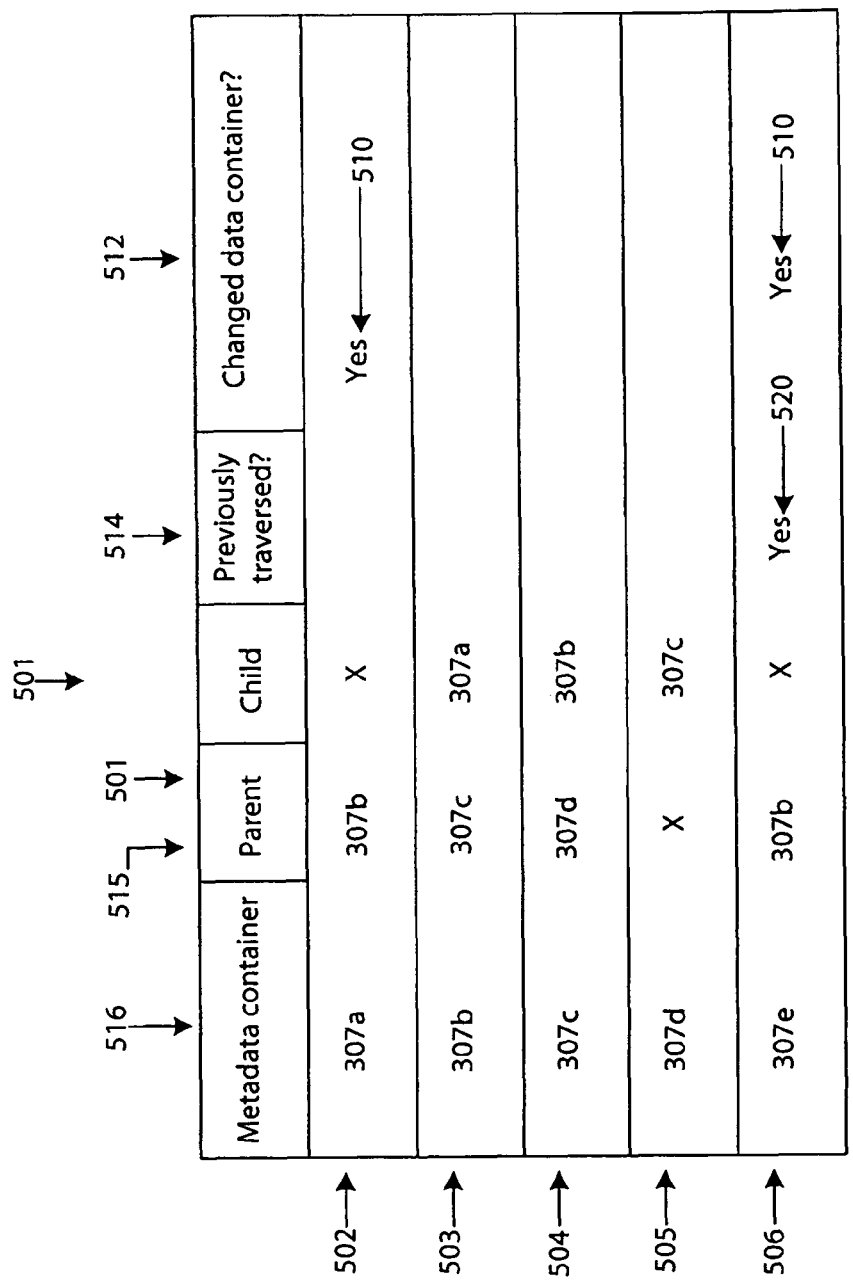
FIG. 5 is block diagram of a table that records parent-child relationships in an embodiment of the invention.

FIG. 4 illustrates additional details of the metadata containers (e.g., inodes) 307a-307d that can be used in an embodiment of the invention. A metadata container contains the metadata for a data container (e.g., file or directory) that is associated with the metadata container. Each data container in a volume in a file system has a separate metadata container (e.g., inode) which contains the data container's metadata. The main purpose of a metadata container 307a is to store metadata about a file (e.g., file 350 in FIG. 3B), including a pointer 386 (FIG. 4) to the tree structure of the file 350, the size 387 (e.g., in kilobytes) of the file 350, the number 388 of data blocks in the file 350, the link count 389 (number of parents of file 350 in the volume), permissions 390 that are associated with the file 350, creation time/date (creation timestamp) 391a of the file 350, access time/date (access timestamp) 392a to the file 350, and modification time/date (modification timestamp) 393a of the file 350. Note that a metadata container could have multiple parents (hard links). In that case, the information associated with all parents of a changed file is also recorded in table 501 (FIG. 5). The creation timestamp 391a indicates the time/date of the creation of the file 350. The modification timestamp 393a indicates, for example, the time/date of the last modification or deletion of the file 350. The metadata container 307a also includes a parent information field 394a that indicates a parent, if any, of the file 350 and a child information field 395a that indicates a child, if any, of the file 350. A metadata container may also include other metadata that are not mentioned herein. Whenever an actual data block in a data container (e.g., file or directory) is modified (e.g., changed, added, deleted, or renamed), at least some of the metadata in the metadata container of the data container will necessarily change.

In an embodiment of the invention, an incremental dump software engine (traversal engine) 405 (which can be, for example, a software code that runs on top of the file system 205 (FIG. 2) and executed by the processor 103) performs a traversal of metadata containers in the file system 205 as discussed below. The engine 405 determines the data containers (e.g., files or directories) that have been modified within a particular time period and also determines the parents of changed data containers and any upper parents, as discussed below. The engine 405 can then perform a standard incremental dump procedure on a media 121 after the engine 405 determines the changed data containers (e.g., files or directories) and parents of changed data containers and any upper parents. As discussed above in the background section, an incremental dump procedure partly involves copying data containers (e.g., files or directories) and associated metadata containers (e.g., inodes) into a media 121 (e.g., tape, disk, or a solid state device such as, for example, flash memory) 121 (FIG. 1) where the data containers have been modified (e.g., changed, added, deleted, or renamed) since performing a previous incremental dump procedure.

To determined the modified data containers, the engine 405 will first traverse (walk) through and check each metadata container (e.g., inode) in the file system 205. In the example of FIG. 4, the metadata containers 307*a*-307*d* are shown in a simplified example. However, in an actual product, the metadata containers in a file system can be many in number. The engine 405 determines each data containers (e.g., files or directories) that have been modified in the file system 205 since the last occurrence of an incremental dump procedure. The engine 405 records the timestamp (date/time) 406 of the previous incremental dump procedure. The engine 405 determines if the file 350 has been changed since the last incremental dump procedure by comparing the creation timestamp 391*a* and modification timestamp 393*a* (in the metadata container 307*a*) with the previous incremental dump timestamp 406. In another embodiment, the creation timestamp 391*a* can also be compared with an original creation timestamp of the data container, to cover a scenario where a modification timestamp has not changed but the creation timestamp has changed for the data container. If the creation timestamp 391*a* or modification timestamp 393*a* for the metadata container 307*a* is later than the previous incremental dump timestamp 406, then the file 350 (corresponding to the metadata container 307*a*) has been changed (e.g., modified, added, or deleted) since the previous incremental dump procedure. Therefore, the engine 405 will then copy (dump) the root node 308 and data blocks 310 of the changed file 350 to the media 121 (FIG. 1) and the metadata container of the changed file 350 during the incremental dump procedure.

As also discussed below, the data and metadata of a parent of a changed file and of any upper parents of the parent are also copied (dumped) to the media 121 during the incremental dump procedure. Note that the data in the media 121 can then later be used in a standard incremental restore procedure to a destination storage appliance (or other backup device), where data in the media 121 is copied to storage spaces in the destination storage appliance. As a result, the data in the destination storage appliance will be the same as the data in the source storage appliance after performing the incremental restore procedure.

The engine 405 will traverse and examine each metadata container (e.g., inode) in the file system 205 in order to determine the files that have been modified since the previous incremental dump procedure. In the example of FIG. 4, the engine 405 will traverse and examine the other metadata containers 307*b*-307*d*. This traversal and examination of the metadata containers is also known as a metadata container walk or inode walk. The engine 405 will compare the creation timestamps and modification timestamps of every metadata container in the file system with the previous incremental dump timestamp 406, in order to identify all corresponding data containers that have been changed since the last occurrence of the incremental dump procedure. The engine 405 will also copy these changed data containers and corresponding metadata containers to the media 121, and these information can be copied from the media 121 to a destination storage appliance by use of a standard incremental restore procedure. Note that an application in a host 110 can alternatively be used to copy the changed data containers and associated metadata containers as well as associated parents and upper parents from the file system to the media 121 during the standard incremental dump procedure.

In an embodiment of the invention, when the engine 405 is traversing and examining each of the metadata containers 307*a*-307*d*, the engine 405 will also read and record the parent-child relationship information of the metadata containers (e.g., inodes) in the file system. For example, the engine 405 determines (from parent information field 394*a*) that the metadata container (e.g., inode) 307*b* is the parent of the metadata container 307*a*, and determines from the child information field 395*a* that the metadata container 307*a* has no child due to the "X" value or "no value" 401 in the field 395*a*. In the metadata container 307*d*, the parent information field 394*d* will indicate an "X" value or "no value" 402 which means that the metadata container 307*d* has no parents and the child information field 395*d* will indicate that the metadata container 307*d* is the parent of metadata container 307*c*. One example of maintaining parent-child mapping information in metadata containers is disclosed in, for example, commonly-assigned and commonly-owned patent application Ser. No. 11/156,679.

In an embodiment of the invention, the engine 405 records the parent-child mapping information (parent-child relationships) in a table 501 as shown in FIG. 5. For example, rows 502-505 show the parent (if any) for metadata containers 307*a*-307*d*. As an option, a child (if any) for a metadata container can also be recorded in the table 501, although this is not a required feature. Column 516 in table 501 will contain information of each modified metadata container such as, for example, the identifier (ID) of each modified metadata container that is traversed by the engine 405 in one embodiment of the invention. In an alternative embodiment of the invention, the identifiers (IDs) are not used, and instead, the table 501 is indexed by the ID of the metadata container. For example, in this alternative embodiment, if a metadata container has an ID 10001, the related record will be at the $10001^{th}$ entry in the table 501.

In an embodiment of the invention, column 516 will also contain the ID of each parent (e.g., directory) that is traversed by the engine 405 and will contain the ID of each parent of a modified metadata container and any upper parent of a parent of a modified metadata container. In the above example, column 516 contains the ID of metadata containers 307*a*-307*e*. The table 501 can, for example, have one entry per metadata container, with each entry indexed by a corresponding metadata container identifier, and this embodiment will advantageously require less space for storing the table 501 in a memory area in a storage appliance 115.

In an embodiment of the invention, the engine 405 will also mark in the table 501 if a data container has been modified since the last occurrence of an incremental dump procedure. For example, in the above example, since the file 350 (which is associated with the metadata container 307*a*) has been changed since the last incremental dump procedure, the engine 405 will mark a flag value 510 in column 512 to indicate the file 350 has changed since the previous incremental dump procedure.

Each changed metadata container corresponds to a data container (e.g., file or directory) that has been modified since the previous incremental dump procedure. The engine 405 will copy (dump) all modified data containers and associated metadata containers from the file system to the media 121 (FIG. 1), and the saved information in the media 121 can then be copied to a destination storage appliance during the standard incremental restore procedure.

As noted above, the engine 405 places a flag value 510 in table 501 for any metadata container that has been modified since the last incremental dump procedure. The engine 405 will dump (to the media 121) the data of a data container corresponding to a modified metadata container.

The engine 405 also identifies the parent (if any) and child (if any) of a changed file by use of the table 501. For example, from row 502, the engine 405 identifies the metadata container 307b as the parent of the metadata container 307a which, in turn, is associated with the changed file 350. The engine 405 will then dump (to the media 121) all data and metadata of the parent (e.g., a directory) that corresponds to the metadata container 307b and also dump all data and metadata of any upper parents of the parent of the changed file. Saving a parent of a changed file or upper parent on a media 121 involves saving the metadata and data of the parent and of any upper parent on the media 121. Saving the metadata of a parent involves, for example, saving a directory inode associated with the parent and associated ACL (access control list) and associated streams of the parent into the media 121. Saving the data of a parent involves saving the data in the directory corresponding to the parent.

In table 501, row 503 indicates that the directory (corresponding to metadata container 307b) has a parent which is a directory corresponding to metadata container 307c. Row 503 also indicates that the directory (corresponding to metadata container 307b) has a child which is the changed file corresponding to metadata container 307a.

The upper parents of any parent of a changed data container are also identified in table 501. For example, row 504 indicates that the directory (corresponding to metadata container 307c) has an upper parent which is a directory corresponding to metadata container 307d. As an optional feature which can be included or omitted in an embodiment of the invention, a row 504 indicates that the directory (corresponding to metadata container 307c) has a child which is the directory corresponding to metadata container 307b.

As previously mentioned above, the parent information of a changed file and any upper parent information are also dump into the media 121. The metadata and data of parents of changed files and upper parent are used for properly updating a changed file in the tree structure representing the file system contents in the destination storage appliance (or other backup device). The creation and use of the table 501 advantageously eliminates the time consuming procedure of performing the two traversals of the tree structure in previous incremental dump procedures.

Figure 6:
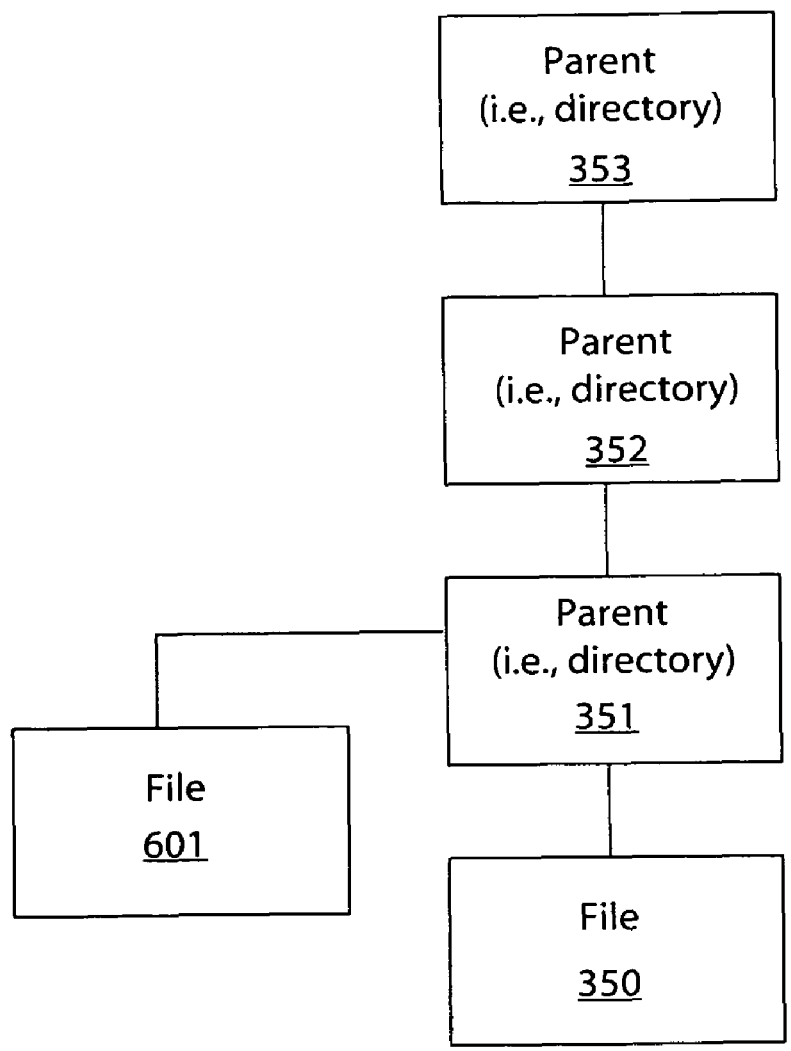
FIG. 6 is a block diagram that illustrates additional details of an embodiment of the invention.

Reference is now made to FIG. 6 that illustrates additional details in accordance with an embodiment of the invention. Assume in this example that file 601 is also a file that has been changed since the previous incremental dump procedure. Therefore, the engine 405 will also copy the file 601 (and the file 350 and any parents) to the media 121 (FIG. 1) during the next incremental dump procedure. Assume further that a metadata container 307e (marked in row 506 in FIG. 5) is associated with the file 601. The engine 405 will also mark into column 512/row 506 with the flag value 510 to indicate that the file 601 is a file that has changed since the previous incremental dump procedure. The engine 405 will also mark a flag value 520 into column 514/row 506 to indicate that the engine 405 has already traversed and examined the parent of metadata container 307e. In this example, the parent of metadata container 307e is also the metadata container 307b (shown in row 502) because in FIG. 6, the directory 351 is the parent of both the files 601 and 350. Therefore, due to the flag value 520 for metadata container 307e, the engine 405 will not need to read and copy the parent 307b of metadata container 307e because the flag value 520 indicates that the data and metadata associated with parent 307b has already copied and dumped by the engine 405 into the media 121. Any upper parent of the parent of metadata container 307e is also marked with the flag 520 since these upper parents have also been dumped into the media 121. Therefore, based on the contents in the parent column 515 and flag 520, the engine 405 can advantageously avoid traversing any previously dumped metadata containers and avoid in repeating the dumping (into media 121) of these previously dumped metadata containers. As a result, the engine 405 can advantageously avoid any additional time required for dumping parents information and any upper parents information into the media 121 (FIG. 1).

It is also within the scope of an embodiment of the present invention to implement a program or code that can be stored in a computer-readable medium to permit a computer to perform any of the methods described above.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for an incremental dump procedure without performing a walkthrough of all of the directory hierarchies in a file system, the method comprising:

accessing in a storage server a file system that contains a plurality of data containers and a plurality of metadata containers, each of the plurality of metadata containers corresponding to a separate one of the plurality of data containers;

traversing the plurality of metadata containers in the file system to read each of the plurality of metadata containers and determine whether each of the plurality of metadata containers has been modified since a previous backup;

for each metadata container determined to have been modified during said traversing, recording, into a table, metadata including a parent information of the modified metadata container and information of the modified metadata container;

recording, into the table, metadata including an upper parent information corresponding to an upper parent of the immediate parent of at least one modified metadata container;

marking a flag value in the table for each previously traversed metadata container and using each said flag value to avoid subsequently reading and copying a previously traversed metadata container;

reading the table to determine each modified data container since the previous backup, an immediate parent of each modified data container since the previous backup, and each upper parent corresponding to the upper parent information; and based on information in the table, saving, into a media, a modified data container corresponding to each modified metadata container since the previous backup, the immediate parent of each modified metadata container since the previous backup, and each said upper parent.

2. The method of claim 1, wherein a modified data container comprises a data container that has been changed, added, deleted, or renamed.

3. The method of claim 1, wherein the table comprises one entry per modified metadata container, with each entry indexed by a corresponding metadata container identifier.

4. The method of claim 1, further comprising:
comparing a previous incremental dump timestamp with a modification timestamp of a metadata container, to determine whether the metadata container is a modified metadata container.

5. The method of claim 1, further comprising:
comparing a previous incremental dump timestamp with a creation timestamp of a metadata container, to determine whether the metadata container is a modified metadata container.

6. The method of claim 1, wherein each of the plurality of metadata containers is an inode.

7. The method of claim 1, wherein at least one of the plurality of data containers comprises a file.

8. The method of claim 1, wherein at least one of the plurality of data containers comprises a directory.

9. An apparatus comprising:
a file system to manage a plurality of data containers and a plurality of metadata containers, each of the plurality of metadata containers corresponding to a separate one of the plurality of data containers; and
a processor configured to
access the file system;
traverse the plurality of metadata containers in the file system to read each of the plurality of metadata containers and determine whether each of the plurality of metadata containers has been modified since a previous backup;
for each metadata container determined to have been modified during said traversing, record, into a table, metadata including a parent information of the modified metadata container and information of the modified metadata container;
record, into the table, metadata including an upper parent information corresponding to an upper parent of the immediate parent of at least one modified metadata container;
mark a flag value in the table for each previously traversed metadata container and using each said flag value to avoid subsequently reading and copying a previously traversed metadata container;
read the table to determine each modified data container since the previous backup, an immediate parent of each modified data container since the previous backup, and each upper parent corresponding to the upper parent information; and
based on information in the table, save, into a media, a modified data container corresponding to each modified metadata container since the previous backup, the immediate parent of each modified metadata container since the previous backup, and each said upper parent.

10. The apparatus of claim 9, wherein a modified data container comprises a data container that has been changed, added, deleted, or renamed.

11. The apparatus of claim 9, wherein the table comprises one entry per modified metadata container, with each entry indexed by a corresponding metadata container identifier.

12. The apparatus of claim 9, further comprising:
comparing a previous incremental dump timestamp with a modification timestamp of a metadata container, to determine whether the metadata container is a modified metadata container.

13. The apparatus of claim 9, further comprising:
comparing a previous incremental dump timestamp with a creation timestamp of a metadata container, to determine whether the metadata container is a modified metadata container.

14. The apparatus of claim 9, wherein each of the plurality of metadata containers is an inode.

15. The apparatus of claim 9, wherein at least one of the plurality of data containers comprises a file.

16. The apparatus of claim 9, wherein at least one of the plurality of data containers comprises a directory.

* * * * *